Aug. 8, 1967  J. F. GRUNDMANN  3,334,547
HYDRAULICALLY OPERATED OSCILLATOR CONTROL APPARATUS
Filed July 30, 1965

JOHN F. GRUNDMANN
INVENTOR.

BY *Seed & Berry*

ATTORNEYS

# United States Patent Office 3,334,547
Patented Aug. 8, 1967

3,334,547
HYDRAULICALLY OPERATED OSCILLATOR CONTROL APPARATUS
John F. Grundmann, 651 S. Irena Ave., Redondo Beach, Calif. 90277
Filed July 30, 1965, Ser. No. 475,943
5 Claims. (Cl. 91—219)

This invention relates to hydraulically-operated reciprocating control apparatus. More particularly, this invention relates to such apparatus adapted for imparting reciprocal or oscillating movement to welding torch electrodes.

Known reciprocating control apparatus for imparting reciprocating movement to devices such as welding torch electrodes are cam operated. Such apparatus is capable of variably controlling the speed and stroke of reciprocal movement but is incapable of variably controlling the dwell or delay period (i.e., period of rest) at each end of the reciprocal motion without replacing the cam with another that will provide a different length of dwell period. In addition, variations in the speed of reciprocal movement in such apparatus cannot be made without changing the length of the dwell period.

A primary object of this invention is to provide a hydraulically-operated reciprocating control apparatus wherein the speed and stroke of the reciprocal movement and the length of dwell period at each end of reciprocal motion are independently variable. Another object is to provide such apparatus adapted to impart a reciprocal movement to welding torch electrodes. These and other objects and advantages of this invention will be apparent from the following description and the accompanying drawing, of which:

Figure 1:
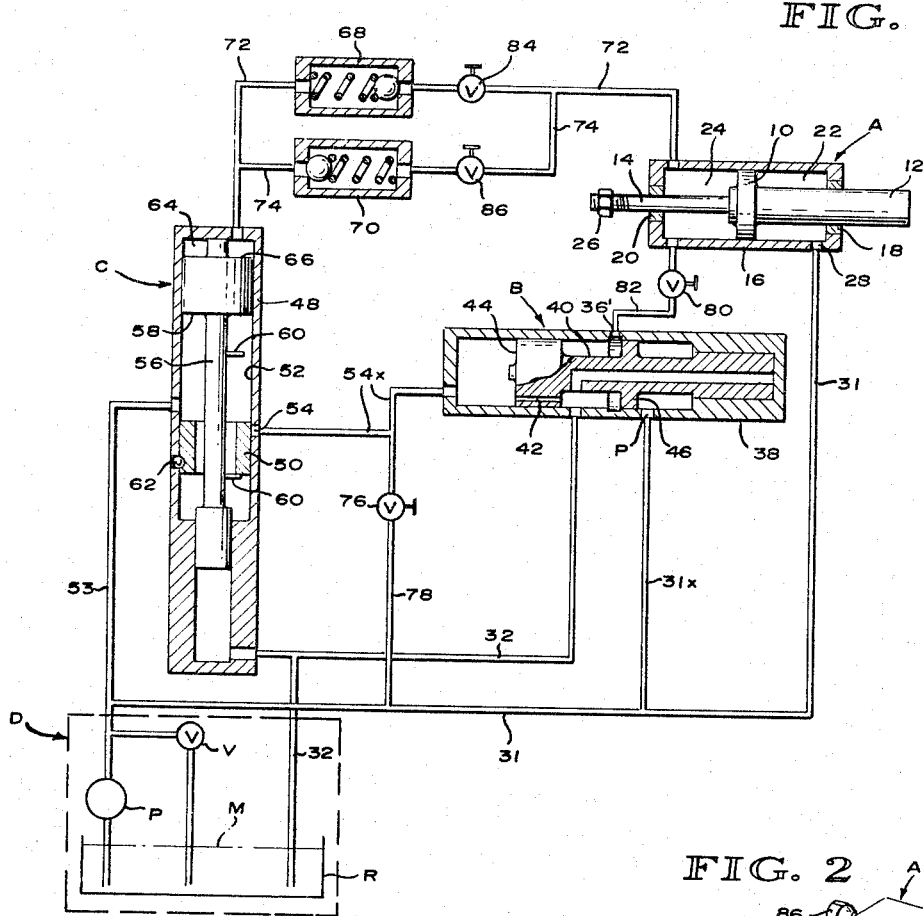
FIGURE 1 is a view schematically showing the principal components of the apparatus of this invention together with its hydraulic pressure system.
Figure 2:
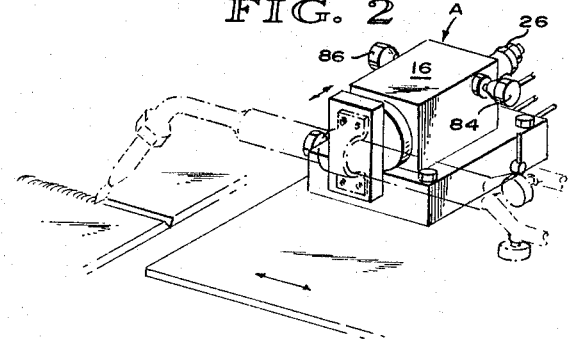
FIG. 2 is a perspective view showing one embodiment of the invention adapted to impart reciprocal motion to a welding torch electrode.
Figure 3:
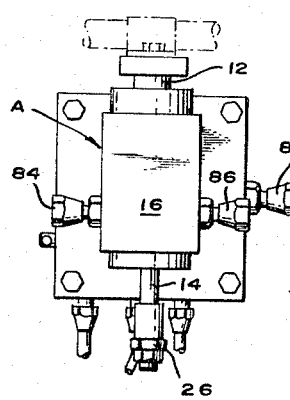
FIG. 3 is a plan view of the apparatus shown in FIG. 2.

In general, this invention comprises a hydraulic actuator section and a hydraulic control valve section for controlling the hydraulic actuator. A reciprocating member or tool arm reciprocates back and forth within adjustable mechanical limits in response to hydraulic fluid directed by suitable valving to either side of a piston, enclosed in a suitable cylinder, connected to the tool arm by means of a piston rod. One end or both ends of the cylinder have mechanical, adjustable stops to limit the maximum stroke of the piston and, thereby, the maximum stroke of the rod and tool arm.

The direction of travel of the piston is controlled by a suitable direction control valve that will operate the piston and piston rod as a differential circuit to equalize speed of travel in both directions. A needle valve or flow control is installed in the port line from a valve port on the direction control valve to the valve end of the piston cylinder to control the rate of flow of fluid in and out of this first end of the cylinder, and thereby to control the rate of travel of the piston. This directional control valve alternately will direct pressurized fluid to the piston in the cylinder or exhaust this first end of the cylinder to a lower pressure in a reservoir or tank containing a supply of hydraulic fluid.

The aforementioned directional control valve is in turn controlled, or shuttled, back and forth by a shuttle valve which supplies hydraulic fluid from an auxiliary connection to the directional control valve. As the shuttle valve spool shuttles back and forth, it causes the directional control valve to shift back and forth to control the direction of movement of the piston in the cylinder.

The shuttle valve in turn receives its signal to shift the position of the directional control valve by a suitably placed pair of check valves, free-flow opposite each other that are placed parallel and connected to the port leading to a second end of the piston rod cylinder. These check valves allow fluid flow from and to the first end of the shuttle valve spool, which is also a differential piston, with constant pressure fluid being supplied to a second end of the valve spool.

Two adjustable needle valves or flow controls are also installed each in series with one of the check valves to control the rate of travel of the shuttle valve spool as fluid is being discharged or supplied to the first end of the shuttle valve spool.

The steps of operation are as follows:

The fluid pressure source (pump) is turned on and supplies pressurized fluid to the directional control valve. Depending on the initial position of the valvings, the piston is forced to one end of the cylinder. When the piston reaches its mechanical stop, the fluid system pressure then rises, causing the shuttle spool to respond to pressure against its second end, shifting the spool and driving fluid out of its first end through the needle valve and through the free-flow check valve and out the tank return line.

When the shuttle valve spool has completed its controlled rate of shift (reciprocating dwell in one direction), it opens a first end of the main directional control valve spool to the tank, causing system pressure to be effective on a second end of the directional control valve spool and shift it over to cause system pressure to be effective on the first end of the piston as well as the second end and thereby cause the piston to travel toward the second end of the cylinder.

When the piston reaches the mechanical stop on this side of the cylinder, system pressure again rises, causing a similar shift of the shuttle valve spool as above by the use of pressure drop across balancing orifices with fluid passing into the first end of the shuttle valve spool through one of the free flow check valves, with volume controlled by the second needle valve or flow control. When the shuttle spool has completed its controlled rate of shift (reciprocating dwell in the other direction), it then directs system pressure to the first end of the directional control valve spool, as well as its second end, causing it to shift and connect the first end of the cylinder to the tank, which in turn causes the piston to repeat the above cycle.

Therefore, before starting and during operation, the speed of travel of the piston may be adjusted; the period of dwell or pause of each end of stroke of the piston may be adjusted individually and independently; and the reciprocating stroke of the piston (and thereby the tool arm) may be adjusted by the moving of the mechanical stops at the ends of the cylinder containing the piston.

Referring more in detail to the schematic drawing:

The apparatus of this invention includes principal components: what will herein be referred to as the "hydraulic actuator section," which is designated in its entirety by reference character A; "a control valve section," designated in its entirety by reference character B; and a two-way on-off control valve designated in its entirety by reference character C.

Combined with the above identified components A, B, and C is a hydraulic power unit D comprising a pump P which draws fluid pressure medium M from a reservoir R and delivers it directly through pressure lines 31 and 53, respectively, to the units A, B, and C. It is also shown in FIG. 1 that a maximum pressure relief valve V is connected to the discharge line of pump P to relieve it of excess pressure medium for its return to the reservoir R. It is further shown that pre-set check valves 68 and 70 are included in pressure connections 72 and 74 between the components A and C, as presently will be described.

First, describing the hydraulic actuator section A: This comprises a closed cylinder 16 reciprocally containing a piston 10 having a large rod portion 12 at one end and a small rod portion 14 extending from its opposite end; the rods 12 and 14 being reciprocally sealed, respectively, in packing glands 18 and 20 in the cylinder end heads through which they operate.

The large rod 12 is adapted to mountingly receive whatever dispensing apparatus is to be used therewith. The small rod 14 has a stop collar 26 threaded onto its extended end portion for adjustment therealong. The axial excursion of piston 10 and rods 12 and 14 is limited in one direction by the stop collar 26 abutting the small rod gland 20 as the larger rod 12 is extended from cylinder 16 and is limited by piston 10 when it abuts the small rod gland 20 inside the cylinder as the large rod 12 retracts.

Located adjacent the actuator section A is the control valve unit B which comprises a closed cylinder 38 in which a spool type three way valve (which is itself a piston operated in a regenerative manner so that its position whether it connects the actuator to fluid pressure or atmosphere is controlled by applying or removing pressure from one end of the piston) is provided.

A large land or sealing portion of spool 40 is provided with a small orifice 42 that connects the large end of the spool with a pressure line that leads to the reservoir. It has been shown in FIG. 1 that a pressure line 31 leads from the pump P to inlet ports 28 that open into the large rod end chamber 22 of cylinder 16. Also, it has been shown that a pressure line 82 joins the small rod end chamber 24 of piston 16 with the cylinder 38 through cylinder wall passages 36 and 36′. It is also to be noted that a pressure line 31x connects line 31 with the small rod end chamber of piston 40 through a cylinder port P. The two-way (on-off) valve C includes a valve of spool design contained in a closed cylinder 48 to control flow of supply pressure to the large end 44 of spool 40 of the three-way valve unit B through a pressure line 54x. The two-way spool 50 of unit C is in the form of a tube which sealingly engages the bore 52 of the cylinder in which it is slidingly mounted. This bore 52 has a passageway 54 in its side wall that communicates through pressure line 54x with the large end 44 of the three-way spool 40. The spool 50 is adapted for covering and sealing the passage 54, thus blocking supply pressure which is continuously exposed to this portion of the bore through pressure line 53. The two-way spool 50 is moved axially by a piston 56 which passes therethrough and which is adapted to operate in a regenerative manner in the same bore 52 in which the two-way spool 50 is located.

The small area end 58 of piston 56 is exposed to the supply pressure that is always present in the two-way supply valve portion of bore 50. Thus, the piston 56 is continuously urged in a direction that causes the two-way valve to block pressure to the large end 44 of the three-way valve spool 40. This piston 56 is provided with two members 60—60 that engage with and move the two-way spool into or out of blocking position with passage 54. Since the distance between the two members 60—60 is considerably greater than the distance between ends of the spool 50, where the members will engage, considerable reverse axial motion of the piston 56 is required before the spool 50 is engaged and moved. The two-way spool 50 is held in whatever position it is moved to by a resilient member 62 mounted in the cylinder wall, that prevents, by friction with the bore 52, motion of spool 50 caused by any means other than the piston 56.

A portion of the two-way valve bore 52, remote from that portion adjacent the spool 50 defines a chamber 64 above the large end 66 of piston 56. This chamber is connected to the actuator cylinder chamber 24 at the small actuator rod end, through two pressure lines 72 and 74 each of which contains a ball check valve. In the passage or pressure line 72, the check valve 68 is arranged so as to permit flow from the actuator chamber 24 to the two-way piston chamber 64 and therefore to the large end 66 of piston 56 and block flow of pressure medium from the two-way piston chamber 64 to the actuator chamber 24. The other line passage 74 has the check valve 70 arranged therein to permit flow from the two-way piston chamber 64 to the actuator chamber 24 and block flow in the opposite direction. The spring load on each ball of the check valves 68 and 70 is a preselected value and in the preferred embodiment, as used in a welding operation, is such as to provide cracking pressure of the valves 68 and 70 of a value of the order of 15% of the supply pressure.

The valves which have thus far been described are those which operate automatically in the hydraulic control valve section of this invention. The remaining valves, now to be described, of the control valve section are all best described as being of the conventional design known in the art as "needle valves" and are all manually operated.

A first needle valve 76 is located in a pressure line 78 that connects the large end 44 of the three-way spool valve 40 with supply pressure from pump P regardless of whether the two-way valve spool 50 is in an unblocked or blocked relationship with cylinder passage 54 from cylinder bore 52. This valve 76, when opened, admits supply pressure to the large end 44 of the 3-way valve spool 40 thus moving the three-way valve spool 40 to a position such that it connects the actuator chamber 24 to atmosphere and thereby causes retraction of the large rod 12 for as long a period as valve 76 remains open. Hence, the valve 76, when opened, stops all motion of the actuator rod 12 by returning it to a retracted position from which the apparatus can be positioned over the work piece from a reliable reference position.

In its opened position, the valve 76 provides a means of stopping the reciprocal operation of the unit without stopping the source of pressure. Closing the needle valve 76 blocks the passage 78 from the large end 44 of the three-way valve spool 49 to the supply pressure and places the three-way valve C under the control of the two-way valve 48 for automatic reciprocation.

A second needle valve 80 is located in the pressure line 82 that connects the three-way valve 38 with the small rod end chamber 24 in the actuator cylinder 16. This valve 80 controls the rate of flow into or from the actuator chamber 24, thereby controlling the speed with which the actuator piston 10 and rods 12 and 14 reciprocate.

A third needle valve 84 is located in the pressure line 72 that connects the actuator chamber 24 which the two-way valve piston chamber 64, and that line has the check valve 68 that permits flow from the actuator chamber 24 to the two-way valve piston chamber 64. This valve 84 controls the rate of flow into the two-way valve piston chamber 64 and thereby controls the length of dwell that the large rod 12 of the actuator remains in its extreme extended position before beginning its motion toward the retracted position.

A fourth needle valve 86 is located in the pressure line 74 that connects the actuator chamber 24 with the two-way valve piston chamber 64 and that line has the check valve 70 permitting flow from the two-way piston chamber 64 to the actuator chamber 24. This valve 86 controls the length of dwell that the large rod 12 remains in its extreme retracted position before beginning its motion toward the extended position.

The reason why the needle valves 84 and 86 control dwell of actuator rod 12 at the end of each excursion will be more clearly understood in the following description:

It will be helpful to have in mind some actual supply pressure, such as 300 p.s.i. and to bear in mind that all elements such as spools and pistons that operate in a regenerative manner have area ratios of two to one. In all of these elements supply pressure is continuously maintained on the smaller area. These elements are, therefore, positioned by application or removal of fluid pressure medium at the larger end area.

Assuming the supply pressure to be 300 p.s.i. and that the check valves 68 and 70 have each been set for a cracking pressure of approximately 45 p.s.i.; with the first needle valve 76 in opened position, the condition of the mechanism is as follows: Supply pressure at the large end 44 of the three-way valve spool 40 maintains it in the position that the small rod end chamber 24 of the actuator is connected to atmosphere and therefore the large rod 12 of the actuator will be in the retracted position due to the force developed by the supply pressure applied through line 31 on the large rod area of the actuator piston 10. The small rod end chamber 24 of the actuator is therefore at atmospheric pressure. Because the small end area 58 of the two-way valve piston 56 is exposed to supply pressure, the large end area 66 of this piston 56, being twice the area of small end 58, is capable of developing a pressure of 150 p.s.i. in the chamber adjacent to the large end 66. But the cracking pressure of check valve 70 that permits flow from the piston chamber 64 to the actuator chamber 24 is 45 p.s.i. so the large end 66 of the two-way valve piston 56 displaces the fluid from the chamber 64 through the check valve 70, and through the fourth needle valve 86 to the actuator chamber 24 which is connected to atmosphere through the three-way valve unit B. In moving to its extreme limit in displacing the fluid in the large end chamber 64, the piston 56 has positioned the two-way valve spool 50 so that it is in a blocked position and remains thus.

Upon closing the first needle valve 76, supply pressure is blocked to the large end 44 of the three-way spool 40 and the spool 40 is displaced by supply pressure acting on the small end 46 of the spool 40 and fluid at the large end 44 of the spool 40 is displaced through the bleed orifice 42 in the spool 40 to the reservoir passage 32 which is at atmosphere. In this position the three-way valve B conducts supply pressure through the second needle valve 80 to the small rod end chamber 24 of the actuator causing the large rod 12 to begin to extend. While the actuator rod 12 is free to extend, the pressure in the small rod end chamber 24 will not exceed half of the supply pressure because of the two to one area relationship of the actuator piston 10. Therefore, as long as the actuator rod 12 is not at its extreme extended position, actuator chamber 24 pressure will remain at approximately 150 p.s.i. and since the cracking pressure of the check valve 68 permitting flow from actuator chamber 24 to piston chamber 64 is 45 p.s.i., only 105 p.s.i. pressure is presented to the piston chamber 64. This 105 p.s.i. pressure is inadequate to displace the two-way valve piston 56. Conditions remain unchanged until the stop collar 26 on the actuator rod 14 abuts the small rod gland 20 which is the maximum extended position of the large rod 12.

At this position, the pressure in the small rod end chamber 24 rises to the full supply pressure and the pressure available to the large end 66 of the two-way valve piston 56 is 300 p.s.i. less the 45 p.s.i. cracking pressure of the check valve 68, or 255 p.s.i. Since the two-way valve piston 56 will be displaced by a pressure greater than 150 p.s.i., the piston 56 moves in a direction that will unblock the two-way valve passage 55 but at a rate that is controlled by the third needle valve 84. The length of dwell of the actuator piston 10 and rod 12 is determined from the moment the large rod 12 reaches its extended limit to the time the two-way valve piston 56 moves the two-way spool 50 to an unblocked position at which position the supply pressure is applied to the large end 44 of the three-way valve spool 40 shifting it to the position which connects the actuator chamber 24 to atmosphere retracting the large rod 12.

During the retraction of the large rod 12 events are similar to those in extension of the large rod. The pressure in the small rod end chamber 24 of the actuator is again 150 p.s.i. because the second needle valve 80 restricts the expelling of fluid from actuator chamber 24. The pressure in the two-way valve piston chamber 64 is also 150 p.s.i. Since flow from the piston chamber 64 to the actuator chamber will not take place until the pressure in these two chambers 25 and 64 differ by an amount exceeding the cracking pressure of check valves 70, the two-way valve piston 56 and spool 50 remain in the unblocked position as long as the actuator rod 12 has not reached its extreme retracted position. Upon contacting of the small rod gland 20 by the actuator piston 10, the pressure in the small rod end chamber 24 drops to atmospheric and the required pressure drop for fluid from the two-way valve piston chamber 64 to the actuator chamber 24 is obtained and the two-way valve piston 56 moves toward the direction that will block flow through the two-way valve passage 54 to the large end 44 of the two-way valve unit B shifts and a new cycle of extent, dwell, retract, dwell is repeated.

In the preferred embodiment the sizes of valve elements are in such relation to the delivery of the hydraulic power unit that the shifting of the three-way spool 40 is extremely rapid so as to be considered almost instantaneous. In this way, the control and repetition of speeds of rod 12 and of dwell periods is extremely accurate and reliable.

What I claim is:

1. A hydraulically operated oscillator apparatus of the character described comprising a hydraulic actuator means comprising a piston and piston rod adapted to be longitudinally reciprocated in a first cylinder by pressurized fluid; a fluid-operated directional control means communicable with said piston for directional control of the piston rod and adapted to alternately permit fluid flow into and from said first cylinder; and fluid-operated means for operating said directional control means to control fluid flow into and from said first cylinder comprising a second cylinder communicable with said first cylinder and with said directional control means, and valve means adapted to be longitudinally moved in said second cylinder in one direction to effect termination of fluid communication between said second cylinder and said directional control means at one end of its longitudinal traverse and to be longitudinally moved in the opposite direction to effect fluid communication between said second cylinder and said directional control means at the opposite end of its longitudinal traverse, movement of said valve means in said one direction being responsive to pressure change in said first cylinder when said piston rod is at one end of its longitudinal traverse and in movement in said opposite direction being responsive to pressure change in said first cylinder when said piston rod is at the opposite end of its longitudinal traverse.

2. Apparatus according to claim 1 wherein said valve means comprises a reciprocally actuatable spool type piston dividing said second cylinder into first and second pressure chambers, the first pressure chamber being communicable with said first cylinder and the second pressure chamber being communicable with a pressurized fluid source and with said directional control means; and a sleeve-like spool slidably fitted within the second pressure chamber of said second cylinder and adapted (a) to be contacted by the spool type piston at one end of the longitudinal travel of the spool type piston in said one direction whereby the sleeve-like spool is moved to a position to terminate fluid communication between said second pressure chamber and said directional control means, and (b) to be contacted by the spool type piston at the opposite end of the longitudinal travel of the spool type piston in said opposite direction whereby the sleeve-like spool is moved to a position to permit fluid communication beween said second pressure chamber and said directional control means.

3. Apparatus according to claim 1 including independently adjustable fluid flow control means interposed between said directional control means and said first cylinder to control fluid flow therebetween and between said first and second cylinders to control fluid flow therebetween.

4. A hydraulically operated oscillator apparatus of the character described comprising a hydraulic actuator means comprising a differential area piston and piston rod adapted to be longitudinally reciprocated in a first cylinder by pressurized fluid, said piston dividing said first cylinder into first and second pressure chambers with said second pressure chamber being communicable with a pressurized fluid source; a fluid-operated directional control means communicable with said first pressure chamber for directional control of said piston rod and with a pressurized fluid source and adapted to alternately permit fluid flow from said source into said first chamber and from said first chamber of said source; fluid operated means for operating said directional control means to control fluid flow into and from said first chamber comprising valve means adapted to be longitudinally moved in a second cylinder in one direction to effect termination of fluid communication between said second cylinder and said directional control means at one end of its longitudinal traverse and to be longitudinally moved in the opposite direction to effect fluid communication between said second cylinder and said directional control means at the opposite end of its longitudinal traverse, movement of said valve means in said one direction being responsive to pressure change in said first pressure chamber when said piston rod is at one end of its longitudinal traverse and movement in said opposite direction being responsive to pressure change in said first pressure chamber when said piston rod is at the opposite end of its longitudinal traverse, said valve means comprising (a) a spool type piston valve element reciprocally actuatable in said second cylinder which divides said second cylinder into third and fourth pressure chambers, said third pressure chamber being communicable with said first pressure chamber and said fourth pressure chamber being communicable with a pressurized fluid source and with said directional control means, and (b) a sleeve-like spool valve element slidably fitted within said fourth pressure chamber and adapted (i) to be contacted by the spool type piston at one end of the longitudinal travel of said spool type piston in one direction whereby the sleeve-like spool valve is moved to a position to terminate fluid communication between said fourth pressure chamber and said directional control means and (ii) to be contacted by the spool type piston at the opposite end of the longitudinal traverse of said spool type piston in the opposite direction whereby the sleeve-like spool valve is moved to a position to permit fluid communication between said fourth pressure chamber and said directional control means; and independently adjustable fluid flow control means interposed between said directional control means and said first pressure chamber to control fluid flow therebetween and between said third and first pressure chambers to control fluid flow therebetween.

5. Apparatus according to claim 4 wherein said directional control means comprises a spool type valve element reciprocally actuatable in a third cylinder; and wherein said piston in said first cylinder, said spool valve element in said second cylinder and said spool valve element in said third cylinder include differential area pressure surfaces with communication from the pressurized fluid source to each cylinder being to the respective pressure chambers exposed to the smaller of the respective differential area pressure surfaces.

References Cited
UNITED STATES PATENTS

| | | | |
|---|---|---|---|
| 1,952,690 | 3/1934 | Strum | 91—308 |
| 2,248,546 | 7/1941 | Morrison et al. | 91—321 |
| 3,165,978 | 1/1965 | Von Ruden et al. | 91—308 |
| 3,190,184 | 6/1965 | Carpenter | 91—219 |
| 3,225,663 | 12/1965 | Pelisson | 91—318 |

MARTIN P. SCHWADRON, *Primary Examiner.*

PAUL E. MASLOUSKY, *Examiner.*